Figure 1:
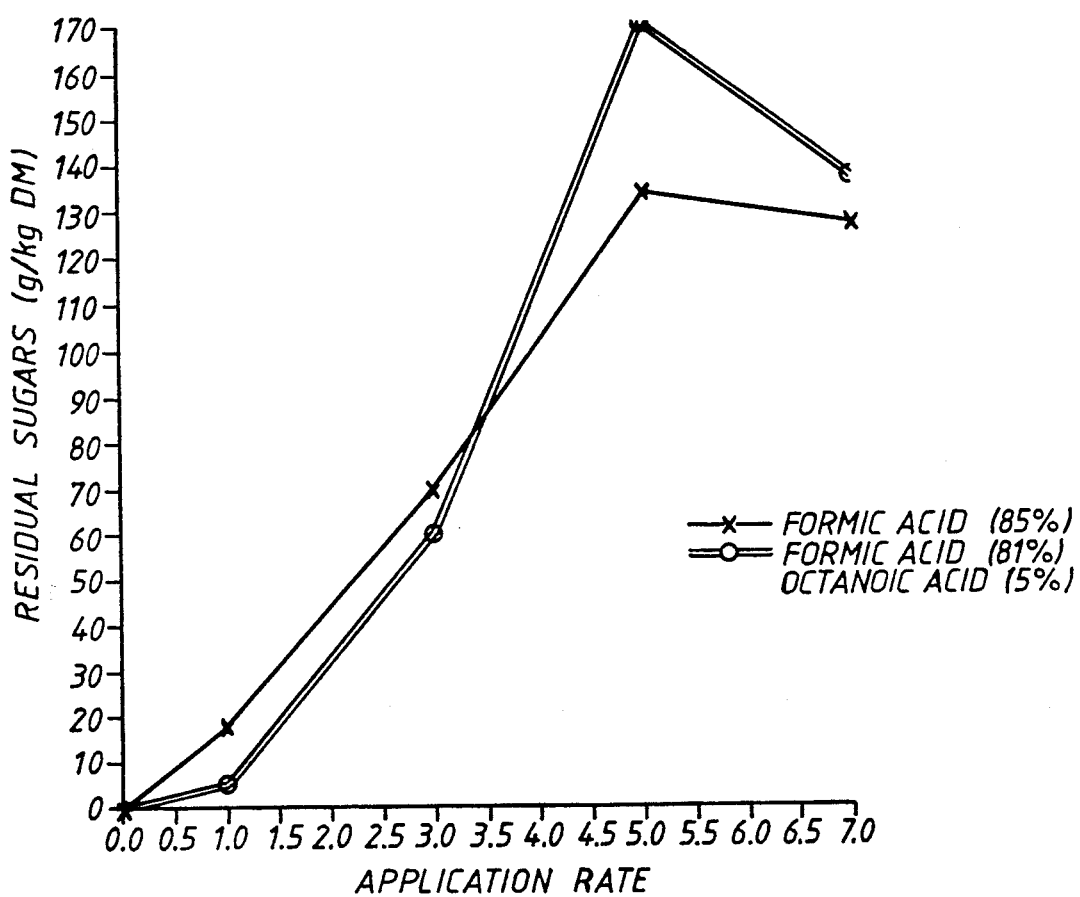

United States Patent [19]

Jackson et al.

[11] Patent Number: 5,082,675
[45] Date of Patent: Jan. 21, 1992

[54] ENSILING COMPOSITION

[75] Inventors: David A. Jackson, Hull; Edward McGee, Potters Bar; David A. Parker, Norther Humberside, all of England

[73] Assignee: BP Chemicals Limited, London, England

[21] Appl. No.: 557,398

[22] Filed: Jul. 23, 1990

[30] Foreign Application Priority Data

Jul. 29, 1989 [GB] United Kingdom ............... 8917384
Dec. 7, 1989 [GB] United Kingdom ............... 8927678

[51] Int. Cl.$^5$ .............................................. A23K 1/22
[52] U.S. Cl. ....................................... 426/54; 426/69; 426/74; 426/623; 426/630; 426/636; 426/807
[58] Field of Search ....................... 426/69, 54, 52, 53, 426/623, 630, 636, 807, 289, 74

[56] References Cited

FOREIGN PATENT DOCUMENTS 2019972 11/1973 Fed. Rep. of Germany .
2653448 3/1978 Fed. Rep. of Germany .
1481961 8/1977 United Kingdom .

OTHER PUBLICATIONS

Journal of the Science of Food and Agriculture, vol. 26, No. 7, 1975, pp. 941-948.
Journal of the Science of Food and Agriculture, vol. 26, No. 2, 1975, pp. 219-228.

Primary Examiner—R. B. Penland
Attorney, Agent, or Firm—Brooks Haidt Haffner & Delahunty

[57] ABSTRACT

This invention relates to aqueous compositions suitable for ensiling substrates said composition comprising formic acid and octanoic acid. The composition may contain in addition other components such as propionic acid and ammonia to improve ease of handling.

The feature of the invention is that octanoic acid, which when used alone, has no ensiling or fermentation activity, has enhanced ensiling activity when used in conjunction with formic acid and thus increases nutritionally desirable sugars in the ensiled product.

15 Claims, 1 Drawing Sheet

EFFECT OF THE INCLUSION OF OCTANOIC ACID ON THE PERFORMANCE OF FORMIC ACID AS A SILAGE ADDITIVE TO INCREASE RESIDUAL SUGARS

ENSILING COMPOSITION

The present invention relates to a composition for use in silage preparation which enables the enhancement of residual sugars during fermentation of silage.

Formic acid is well known to be an excellent silage additive. The acid, usually at about 80% w/w concentration in aqueous solution, is usually applied on the substrate to be ensiled at the rate of about 2-4 liters per ton. At these levels lactic acid fermentation occurs. In order to restrict the fermentation process and to enhance the residual sugar content of the ensiled substrate e.g. grass, it is necessary to increase the application rate of formic acid (85% w/w) to about 6 liters per ton.

However, increasing formic acid in silage not only makes the silage less palatable to the animals but inevitably increases acidity of the silage thereby causing corrosion problems during storage etc. Moreover, formic acid has relatively low antimicrobial activity and hitherto this has been mitigated by the use of various quantities of sterilants such as e.g. formaldehyde.

It has now been found unexpectedly that a higher carboxylic acid when used together with formic acid in appropriate proportions can mitigage these effects.

Accordingly, the present invention relates to an aqueous composition suitable for use as an ensiling agent comprising a combination of formic acid and octanoic acid.

The relative proportions of formic acid and octanoic acid in the composition are suitably such that for every 100% w/w of an aqueous solution of formic acid (containing 85% w/w formic acid) there is present suitably from 0.5-10% w/w, preferably from 2-8% w/w of octanoic acid.

The composition is most suitable for ensiling substrates and is preferably applied to the substrate in an amount ranging from 0.35 to 0.9% w/w, most preferably from 0.4-0.7% w/w of the substrate.

The compositions of the present invention may contain in addition other components including propionic acid and ammonia depending upon the activity desired. For instance in a formulation containing both these additional components, formic acid and octanoic acid, the ratio of propionic acid to octanoic acid is suitably at least 2:1 w/w, preferably from 3:1 to 5:1 w/w; and the molar ratio of formic acid to ammonia in said composition suitably is at least 4:1, preferably from 4:1 to 8:1, typically 6:1.

Thus a typical composition of this type may contain 75.7% w/w of an aqueous solution of formic acid (corresponding to 64.345% w/w actual formic acid), 10.0% w/w propionic acid, 2.0% w/w octanoic acid and 12.3% w/w aqueous ammonia. (corresponding to 4.06% w/w actual ammonia).

The composition may be applied to the substrate either by direct mixing of the harvested substrate with the ensiling formulation or by impregnating a particulate and porous carrier material such as pumice, vermiculite, perlite dried beet pulp or dried citrus pulp with the formulation and then uniformly distributing the impregnated carrier into the substrate to be ensiled.

Thus, according to a further embodiment the present invention is a process for ensiling substrates as hereinafter defined, said substrate being treated with an aqueous composition by mixing said composition comprising a mixture of formic acid and octanoic acid thoroughly with the substrate to be ensiled.

By the term "substrate" is meant here and throughout the specification grass, agricultrual crops and whole plant materials used in preparing animal feedstuffs such as grass, lucerne, alpha alpha, barley, wheat, oats, rye, maize, rice, hay, silage, tick beans, soya beans, sunflower seed, rape seed, groundnuts.

A feature of the invention is the synergistic effect observed by using a combination of these acids whereby the $C_8$ acid not only aids inhibition of the rapid fermentation induced by relatively low levels of formic acid so as to reduce levels of lactic acid formed and enhance residual sugars in the ensiled substrate but also confers a preservative antimicrobial effect on the substrate treated.

Moreover, the level of formic acid addition can be reduced in spite of the $C_8$ acid which, when used alone, has little or no known ensiling or fermentation activity.

The present invention is further illustrated with reference to the following example and accompanying graph.

EXAMPLE 1

The experiments reported below were designed to compare he effect of (i) formic acid (85% w/w aqueous solution) applied at 1,3,5 and 7 litres/t, alone and (ii) as a blend thereof with octanoic acid on the biochemicals changes occurring during the ensilage of lucerne (*Medicago sativa*).

The residual sugars (water soluble carbohydrates) found in the silage after 100 days peaked at the application rate of 5 liters/t. At these levels fermentation of the silage was clearly restricted and the inclusion of octanoic acid (5% w/w) increased the efficacy of the additive. This is graphically shown in FIG. 1.

EXAMPLES 3 AND 4 (LABORATORY SCALE)

During the natural fermentation process of ensilage, the desirable sugars found in grass are converted to undesirable lactic acid by the epiphytic microflora. This results in the production of a forage that is deficient in the desirable sugars and therefore the efficiency of utilisation by the animal is reduced. The formulations of the present invention were developed specifically to suppress this natural fermentation process and therefore enable these feedstuffs to retain many of the nutritional advantages of fresh grass feed.

The following Examples 2, 3 and 4 demonstrate this effect. In these Examples the ensiling formulation used contained:

Aqueous formic acid—75.7% w/w (64.345% w/w actual formic acid)
Propionic acid—10.0% w/w
Octanoic acid—2.0% w/w
Aqueous ammonia—12.3% w/w (4.06% w/w actual ammonia).

EXAMPLE 2 (FARM TRIAL)

The study was carried out on a diary farm.

A total of 1300 tonnes of grass was ensiled on July 3rd, 1989 with approximately 500 tonnes treated with the formulations specified above at 6 liters/tonne level by thoroughly mixing the formulation with the chopped grass as it was being harvested. The remainder was left untreated. In both cases the grass was stored under substantially anaerobic condition for 50 days.

Thereafter the ensiled samples were analysed for standard nutritional parameters using the techniques described in "The Analysis of Agricultural Materials", Ministry of Agriculture Food and Fisheries, RB 427, 2nd Edition, published in 1981 by Her Majesty's Stationery Office, London. The appropriate pages relevant for the specific analyses are indicated, where applicable, in the Tables below:

| Results | TREATED* | UNTREATED | PAGE REF |
|---|---|---|---|
| Dry Matter (%) | 39.3 | 35.2 | 74 |
| pH | 4.4 | 4.1 | 87 |
| Ammonia N as % Total N | 5 | 5 | Steam distillation |
| Crude Protein | 15.5 | 12.9 | 130 |
| Mad Fibre | 53.6 | 55.9 | 82 |
| Ash | 7.9 | 7.6 | 16 |
| Sugars | 20.5 | 6.3 | 36 |
| Digestibility (estimate) | 58 | 63 | — |
| Lactic acid | 0.96 | 8.03 | 204 |

*According to the invention.

The formulations of the present invention restricted the natural fermentation process producing a forage high in residual sugar and low in fermentation products e.g. lactic acid.

The following Examples 3 and 4 were carried out in a laboratory. Fresh grass was ensiled in mini silos (5 kg) by mixing the grass in chopped form with the formulations referred to above using commercial mixing equipment. The mixture was ensiled in anaerobically sealed containers for 80 days under ambient conditions. The container was then opened and the contents sampled for analysis as previously stated in Example 2 above.

EXAMPLE 3

| Results | TREATED* | UNTREATED | PAGE REF |
|---|---|---|---|
| Dry Matter (%) | 22.4 | 21.8 | 74 |
| pH | 4.8 | 4.0 | 87 |
| Ammonia N as % Total N | 10 | 10 | Steam distillation |
| Crude Protein | 14.2 | 13.6 | 130 |
| Mad Fibre | 58.0 | 53.1 | 82 |
| Ash | 12.5 | 13.1 | 16 |
| Sugars | 13.5 | 1.4 | 36 |
| Digestibility (estimate) | 54 | 56 | — |
| Lactic acid | 0.00 | 7.56 | 204 |

*According to the invention.

The formulations according to the invention restricted the natural fermentation process producing a forage high in residual sugar and no detectable fermentation products (lactic acid).

EXAMPLE 4

| Results | TREATED* | UNTREATED | PAGE REF |
|---|---|---|---|
| Dry Matter (%) | 32.0 | 32.1 | 74 |
| pH | 4.2 | 4.1 | 87 |
| Ammonia N as % Total N | 7 | 7 | Steam distillation |
| Crude Protein | 19.9 | 19.0 | 130 |
| Mad Fibre | 51.3 | 49.8 | 82 |
| Ash | 18.5 | 18.0 | 16 |
| Sugars | 6.1 | 2.0 | 36 |
| Digestibility (estimate) | 52 | 53 | — |
| Lactic acid | 3.55 | 5.86 | 204 |

*According to the invention.

The formulations according to the present invention restricted the natural fermentation process producing a forage high in residual sugar and low in fermentation products e.g. lactic acid.

We claim:

1. An aqueous composition suitable for use as an ensiling agent consisting essentially of a combination of formic acid and octanoic acid, said composition being present in an amount effective to produce silage enhanced in residual sugars, reduced in lactic acid and without a substantial adverse effect on digestibility.

2. A composition according to claim 1 wherein the aqueous composition has from 10 to 50% w/w of water.

3. A composition according to claim 1 wherein said composition contains 0.5-10% w/w of octanoic acid per 100% w/w of aqueous formic acid (containing 85% w/w of formic acid).

4. A composition according to claim 1 wherein said composition comprises formic acid, propionic acid, octanoic acid and ammonia.

5. A composition according to claim 4 wherein the ratio of propionic acid to octanoic acid is at least 2:1 w/w; and the mole ratio of formic acid to ammonia is at least 4:1.

6. A composition according to claim 4 wherein the composition comprises:
  aqueous formic acid—75.7% w/w (64.345% w/w actual formic acid)
  propionic acid—10.0% w/w
  octanoic acid—2.0% w/w and
  aqueous ammonia—12.3% w/w (4.06% w/w actual ammonia).

7. A process for ensiling a substrate which comprises applying a substrate selected from the group consisting of grass, agricultural crops and whole plant materials with a porous particulate carrier material impregnated with an aqueous composition comprising formic acid and octanoic acid so as to uniformly distribute said impregnated carrier in said substrate, said composition being present in an amount effective to produce silage enhanced in residual sugars, reduced in lactic acid and without a substantial adverse effect on digestibility.

8. A process for ensiling a substrate according to claim 7 wherein the carrier material is selected from pumice, vermiculite, perlite, dried beet pulp and dried citrus pulp.

9. A process according to claim 7, wherein the substrate is a whole plant material selected from the group consisting one or more materials of grass, lucerne, alpha alpha, maize, rice, hay, silage, tick beans, soya beans, sunflower seed, rape seed and groundnuts.

10. A process as defined in claim 7 wherein said aqueous composition comprises 0.5-10% w/w/ of octanoic acid per 100% w/w of aqueous formic acid (containing 85% w/w of formic acid).

11. A process as defined in claim 7 wherein the aqueous composition is applied to the substrate in an amount of from about 0.35 to 0.9% w/w of the substrate.

12. A process for ensiling a substrate which comprises thoroughly mixing a substrate selected from the group consisting of grass, agricultural crops and plant material with an aqueous composition comprising formic acid and octanoic acid, said composition being present in an amount effective to produce silage enhanced in residual sugars, reduced in lactic acid and without a substantial adverse effect on digestibility.

13. A process according to claim 12, wherein the substrate is a whole plant material selected from the group consisting one or more materials of grass, lucerne, alpha alpha, maize, rice, hay, silage, tick beans, soya beans, sunflower seed, rape seed and groundnuts.

14. A process as defined in claim 12 wherein said aqueous composition comprises 0.5-10% w/w of octa- noic acid per 100% w/w of aqueous formic acid (containing 85% w/w of formic acid).

15. A process as defined in claim 12 wherein the aqueous composition is mixed with the substrate in an amount of from about 0.35 to 0.9% w/w of the substrate.

* * * * *

UNITED STATES PATENT AND TRADEMARK OFFICE
CERTIFICATE OF CORRECTION

PATENT NO. : 5,082,675
DATED : January 21, 1992
INVENTOR(S) : DAVID A. JACKSON et al It is certified that error appears in the above-identified patent and that said Letters Patent is hereby corrected as shown below:

Claim 9, l. 3, after "consisting" insert --of--.

Claim 13, l. 3, after "consisting" insert --of--.

Signed and Sealed this

Twenty-seventh Day of April, 1993

Attest:

MICHAEL K. KIRK

Attesting Officer

Acting Commissioner of Patents and Trademarks